(12) United States Patent
Cheng et al.

(10) Patent No.: US 8,037,155 B2
(45) Date of Patent: Oct. 11, 2011

(54) MULTIMEDIA CONTROL CENTER

(75) Inventors: Monsong Cheng, Katonah, NY (US);
Huey-Shiang (Sharon) Chen, Katonah, NY (US); Aubrey Flanagan, Franklin Park, NJ (US); Bodhi Muhkerjee, Hopewell JN, NY (US)

(73) Assignee: InfoValue Computing, Inc., Elmsford, NY (US)

( * ) Notice: Subject to any disclaimer, the term of this patent is extended or adjusted under 35 U.S.C. 154(b) by 232 days.

(21) Appl. No.: 11/726,300

(22) Filed: Mar. 21, 2007

(65) Prior Publication Data

US 2007/0266416 A1    Nov. 15, 2007

Related U.S. Application Data

(60) Provisional application No. 60/799,702, filed on May 11, 2006.

(51) Int. Cl.
*G06F 15/16* (2006.01)
(52) U.S. Cl. ......... 709/217; 709/218; 709/219; 709/229
(58) Field of Classification Search .......... 709/217–219, 709/229
See application file for complete search history.

(56) References Cited

U.S. PATENT DOCUMENTS

| | | | |
|---|---|---|---|
| 4,949,187 A | 8/1990 | Cohen | |
| 5,586,186 A | 12/1996 | Yuval et al. | |
| 6,275,936 B1 | 8/2001 | Kyojima et al. | |
| 6,587,403 B1 | 7/2003 | Keller et al. | |
| 6,654,540 B2 | 11/2003 | Artigalas et al. | |
| 6,665,797 B1 | 12/2003 | Keung | |
| 6,799,226 B1 | 9/2004 | Robbin et al. | |
| 7,254,622 B2 * | 8/2007 | Nomura et al. | 709/219 |
| 7,302,465 B2 * | 11/2007 | Ayres et al. | 709/203 |
| 7,395,339 B2 * | 7/2008 | Kirkland | 709/229 |
| 2002/0078176 A1 * | 6/2002 | Nomura et al. | 709/219 |
| 2004/0224638 A1 | 11/2004 | Fadell et al. | |
| 2005/0227773 A1 * | 10/2005 | Lu et al. | 472/60 |
| 2005/0235338 A1 * | 10/2005 | AbiEzzi et al. | 725/142 |
| 2006/0253400 A1 * | 11/2006 | Okamoto et al. | 705/57 |
| 2007/0260551 A1 * | 11/2007 | Eckleder | 705/59 |

* cited by examiner

*Primary Examiner* — Asad M Nawaz
(74) *Attorney, Agent, or Firm* — Saile Ackerman LLC; Stephen B. Ackerman

(57) ABSTRACT

A video library is formed within a personal video depot (PVD). The PVD has capability to accept purchased video's and DVD's as well as personal video's captured on camcorders. The purchased video's and DVD's are rights verified and assigned to a user having an authenticated ID. The PVD has capability to play a selected video on a TV as well as acquire additional video titles from the server connected to the depot through a network. A menu is displayed on a TV from which a remote control is used to make selections that affect the purchase of video titles and operation of the PVD.

18 Claims, 3 Drawing Sheets

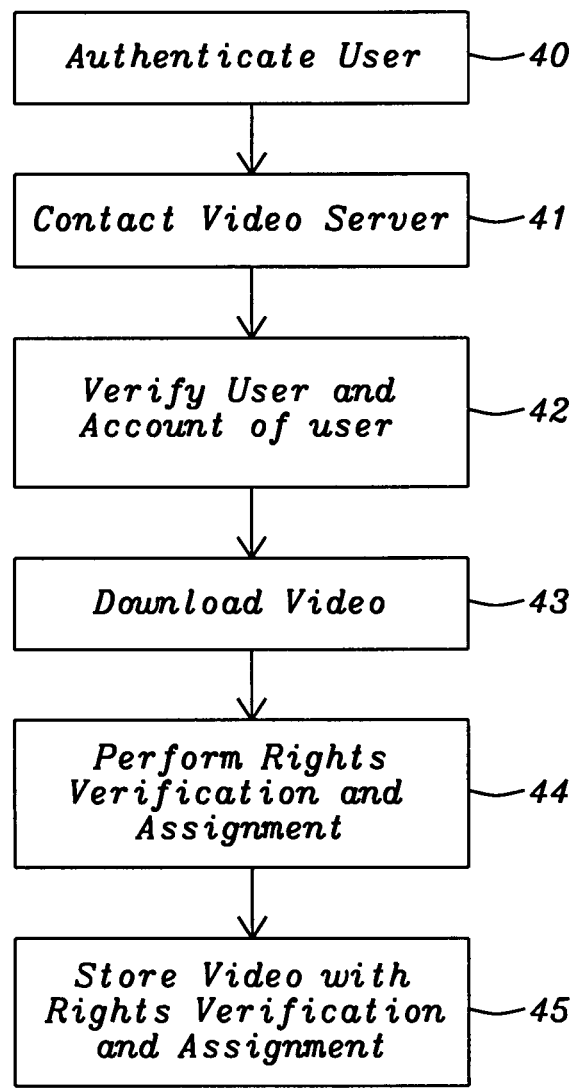

MULTIMEDIA CONTROL CENTER

This application claims priority to Provisional Patent Application Ser. No. 60/799,702, filed on May 11, 2006, which is herein incorporated by reference in its entirety.

BACKGROUND OF THE INVENTION

1. Field of Invention

The present invention relates to multimedia systems, and in particular personal multimedia systems used to form libraries of multimedia including video and audio files.

2. Description of Related Art

In today's environment it is important to use commercially produced multimedia, i.e. analog and digital video, DVD's and CD's, in a manner consistent with industry license standards. Building personal libraries often consists of a rack of DVD and CD disks that are separately loaded into a player having one or more slots to hold the disks. Unless an individual creates a cataloging scheme, it is sometimes difficult to find a particular DVD or CD. Once a DVD containing a movie has been viewed, reviewing may not be as frequent as listening to a CD containing favorite music and the library of DVDs grows without frequent reuse.

A solution to the growing DVD library, which consumes space and requires physical organization, is to store video content into a personal video library and index the videos for future use. A user verification and a rights verification included in the personal video library guarantees the storage and use of the video's according to industry license standards.

U.S. Pat. No. 6,799,226 (Robbin et al.) is directed to techniques for rendering a peripheral device, which includes a data storage device, capable of being unplugged without preparatory user actions. U.S. Pat. No. 6,665,797 B1 (Keung) is directed to a program for providing identity information of the rightful user for accessing a network central computer to obtain services and/or software products. In U.S. Pat. No. 6,654,540 B2 (Artigalas et al.) a method and device is directed to a recording and reading apparatus constituting a video reservoir in the home of the consumer. In U.S. Pat. No. 6,275,936 B1 (Kyojima et al.) a method and apparatus is directed to access right authorization.

U.S. Pat. No. 6,587,403 (Keller et al.) is directed a music jukebox, which is configured for storing therein a music library. US 2004/0224638 (Fadell et al.) is directed to a media player system comprising a docking system, wireless capability, media storage and performing as a handheld music player. In U.S. Pat. No. 5,586,186 (Yuval et al.) a method and system is directed to controlling unauthorized access to information distributed to a user. U.S. Pat. No. 4,949,187 (Cohen) is directed to a video communication system that allows users to download a movie in digital format and store the movie locally for viewing at any time.

SUMMARY OF THE INVENTION

It is an objective of the present invention to provide a personal video depot (PVD) for storing, organizing and playing a library of video content comprising personal and commercial titles.

It is also an objective of the present invention to couple the PVD to a commercial source of video titles, select a video title and store the selected title with a rights verification and assignment into the PVD.

It is further an objective of the present invention to use a remote control to navigate a menu displayed on a TV screen to select a video and play the video with full interactive control.

It is also further an objective of the present invention to provide compliance to video industry license standards.

It is still further an objective of the present invention to authenticate the identity of the user.

The present invention comprises a personal video depot (PVD) capable of capturing video content from several sources comprising analog video, digital video, DVD (digital video disk) and service portals from which video titles can be directly purchased and downloaded. The PVD contains several units comprising a content capture unit, a user authentication unit, a rights verification and assignment unit, a storage system, an extension port for additional storage, a TV interface and a player device interface. The user of the PVD can store personal videos taken with the use camcorder, which produces either analog video or digital video. Also the user can store personally acquired DVD's in to the storage unit contained within the PVD.

The PVD is coupled through a network, i.e. the internet or similar networks, to a server. The user of the PVD registers with the server and through that registration is allowed to purchase video titles maintained at the server, which maintains a library of video titles. The user upon authentication by the use of a smart card or entering a pin number or equivalent authentication means can select from the menu of video titles at the server. When a video is downloaded to the PVD a rights verification and assignment is performed and coupled to the downloaded video and stored in the storage system within the PVD. The user of the PVD can now play the video title on a TV once the user has been authenticated using a smart card, a pin number or equivalent authentication means.

BRIEF DESCRIPTION OF THE DRAWINGS

This invention will be described with reference to the accompanying drawings, wherein:

FIG. 3 is a diagram of the stored content of a purchased video file into the personal video depot of the present invention;

FIG. 4 is a method of the present invention for acquiring a video title from a server.

DETAILED DESCRIPTION OF THE PREFERRED EMBODIMENT

Figure 1:
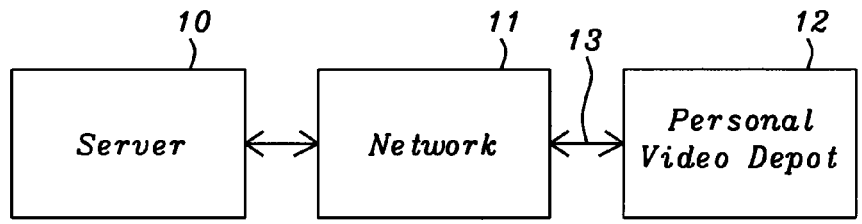
FIG. 1 is a block diagram of the present invention demonstrating the coupling of a personal video depot through a network to a server.

In FIG. 1 is shown a coupling between the personal video depot (PVD) 12 of the present invention and a server 10. A network 11 is used to couple the server 10 to the PVD 12 through a network interface port 13 of the PVD. The network can include a variety of networks comprising the internet, a cable network and a satellite network. When the server is contacted by the user of the PVD, a selection of a video title is made available for purchase and is downloaded to the PVD of the user.

Figure 2:
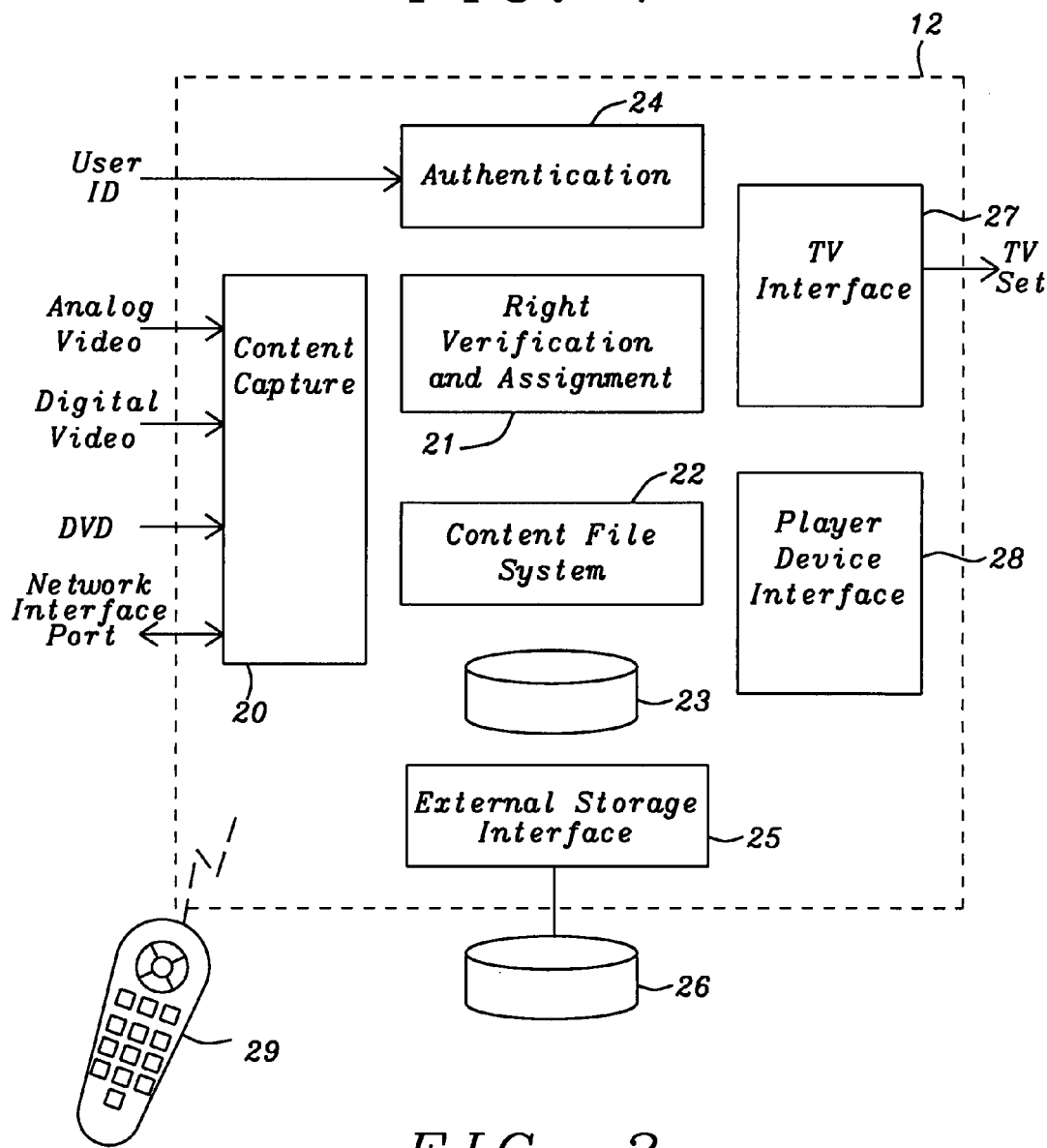
FIG. 2 is a diagram of the personal video depot of the present invention.

Shown in FIG. 2 is a block diagram of the PVD 12. The content capture unit 20 captures video content from external sources, i.e. networks such as internet, cable and satellite, DVD disks, and personal movies created by personal video cameras. The content capture unit 20 reads in digital video content from digital sources such as a network interface port connected to a server and a DVD, and digitizes, compresses and encrypts analog video into a standard compliant digital video such as MPG2. The content capture unit is managed by the rights verification and assignment unit 21 to comply with commercial license control mechanisms. The video content coupled with the proper rights assignment information is recorded into the storage system 23 controlled by the content file system 22. Each viewing of a video from the service portal or DVD input to the PVD 12 requires authentication of the user 24, which is accomplished by the use of a smart card, a personal identification number or similar means. Each commercial video obtained from the server or separately purchased DVD is encrypted with a license key that is unique to the user's ID and the specific title of the commercial video.

Continuing to refer to FIG. 2, the user authentication unit 24 is used to verify the identity of the user using various methods comprising a smart card, an entry of a PIN (personal identification number) with the key pad of a remote control unit 29 which operates the PVD of the present invention. This allows the user to protect his/her library of video files and prevent unauthorized use including the copying of video files from the library as well as identify the user as being authorized to use the video content stored within the PVD. The user authentication 24 is also important for identifying the user to the server 10 when purchasing video tiles to be downloaded from the server. If ownership of a particular video content is to be copied to a second user, the second user is required to identify himself/herself to the system using a smart card, pin number or similar means. The rights verification and assignment unit 21 verifies that the user has the right to download new video content, play a video resident in the storage unit. If a second user wants a copy of a video, the second user must have his/her identification authenticated by the use of a smart card or pin number associated with the second user, whereby a fee is paid by the second user for the video copied from the first user. The second user assumes ownership of the copy taken from the first user.

The storage system, comprising the content file system 22, the internal storage system 23, the external storage interface 25 and an external storage device 26, organizes the video data to provide flexibility in the usage of the data and to insure the security of the video data. As shown in FIG. 3, each video file in the storage system comprises the rights assignment 30 from the rights verification and assignment unit 21 and the video content 31, which is a bit stream copy of the encrypted video originally entered into the depot, coupled with further necessary encryption based on rights assignment 30.

Continuing to refer to FIG. 2 the TV interface unit 27 allows the user to operate the PVD 12 of the present invention with a TV set using a GUI (graphical user interface) displayed on the TV screen and a remote control unit to select from the menu in the GUI. The player device interface unit 28 allows other player devices, i.e. DVD player/recorder or a PC (personal computer) to play a video stored in the PVD 12 of the present invention in which the PVD 12 becomes an authenticated security sensitive storage device.

The internal storage device 23, comprising a hard disk drive, a flash memory or other similar nonvolatile storage medium, is used to store videos within the PVD that have been rights verified by the rights verification and assignment unit 21. This storage capability can be expanded through an external storage interface 25 coupled to the content file system 22 using a coupling medium comprising USB (universal system bus), IEEE 1394 connection means or similar connection technology. The external storage device 26 comprises a hard disk drive, flash memory or other nonvolatile storage medium.

The player device interface 28 allows other player devices, i.e. a PC (personal computer), a DVD player and similar electronic equipment to play videos stored within the PVD. The PVD becomes an authenticated source and security sensitive storage device of video files similar to a DVD or a USB hard disk.

In FIG. 4 is shown a method of the present invention for purchasing and downloading a video in digital form from a server. The user is authenticated 40 by using a smart card, a personal identification number (PIN) or similar identification means. Using the remote 29 to select from a menu on a TV screen, the user commands the PVD to contact a server 41. The server verifies the user and the user's account 42. The server returns a menu of available video titles from which the user selects a desired title. Once the title has been selected using the remote device 29, the user commands the PVD to request the server to download the video 43. Upon receipt of the video, a rights verification and assignment is performed 44 which assigns the rights to the user to be able to use the video for the purposes of the user. Upon completion of the rights verification and assignment, the video content 31 and the rights assignment 30 are stored in the storage device of the PVD. The PVD can also assign rights to an ingested DVD purchased separately through the server and upon completion of the rights assignment store video content from the DVD along with the rights assignment. As long as the user uses the downloaded video or the DVD for personal means, the assigned rights are valid and do not need to be re-verified.

Figure 5:
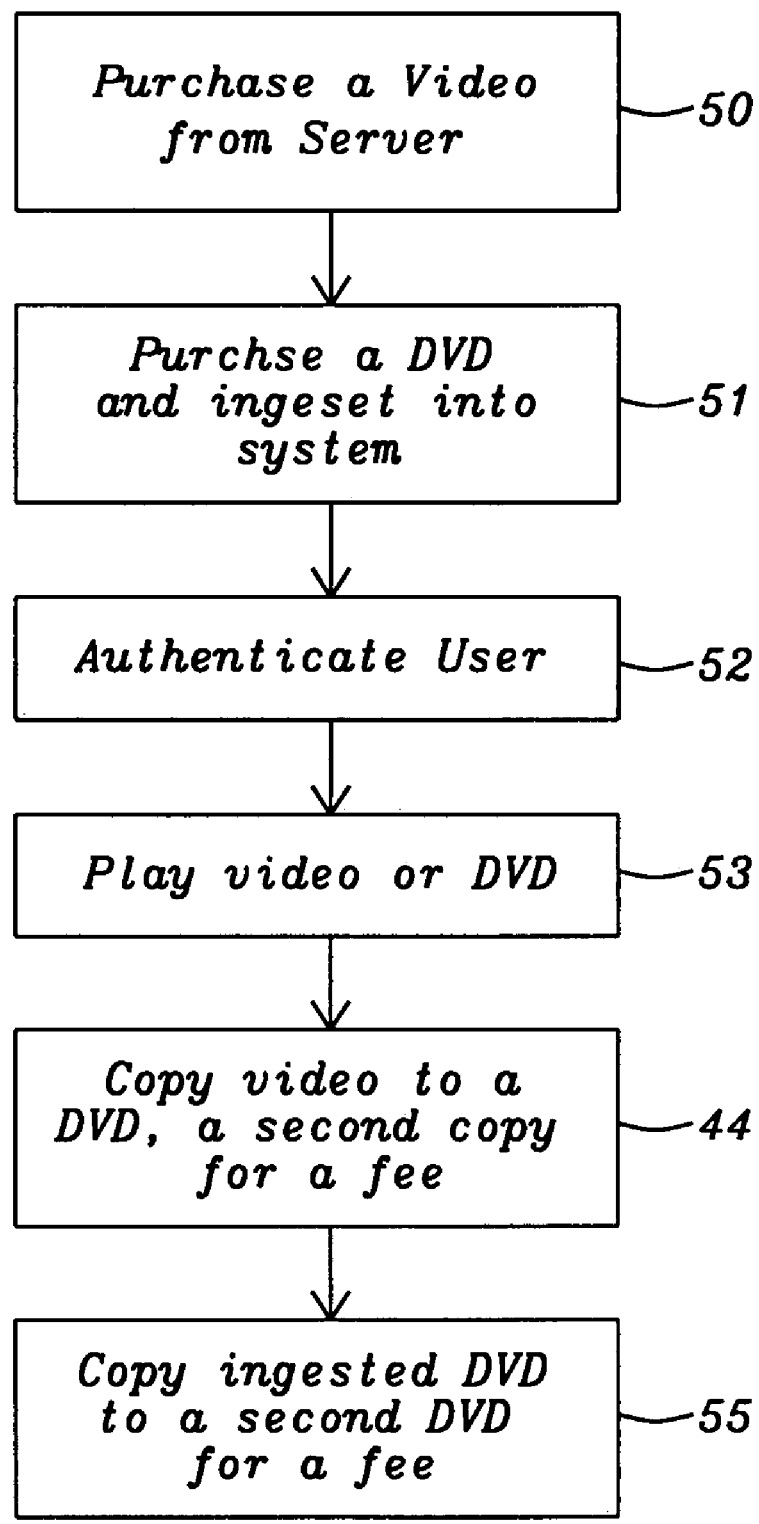
FIG. 5 is a method of the present invention for using the personal video depot.

In FIG. 5 is shown a method for using the PVD of the present invention. Either a video is purchased from a server 50 coupled to the PVD or a purchased DVD is ingested 51 into the PVD. The user ID is authenticated 52. The rights verification and assignment is performed on the video purchased from the server or the ingested DVD and stored with the purchased video from the server or the purchased DVD. The server purchased video or the DVD are played on a TV coupled to the PVD 53. The user of the PVD has an option to copy the video purchased from the server to a DVD 54 and to copy the purchased DVD to an additional DVD 55. Many different licenses and payments schemes could be implemented based on this framework. For example: In the case of a video purchased from the server, a first copy of the purchased video is made without a fee and a second or subsequent copy of the video purchased from the server is assessed a fee. In the case of the ingested DVD, a second or subsequent DVD is copied for a fee that is different for the user of the PVD than for individuals that are not the registered user of the PVD.

While the invention has been particularly shown and described with reference to preferred embodiments thereof, it will be understood by those skilled in the art that various changes in form and details may be made without departing from the spirit and scope of the invention.

What is claimed is:

1. A personal video library system, comprising:
  a) a personal video depot (PVD) wherein said PVD comprises
    i) a nonvolatile storage;
    ii) a TV interface function;
    iii) a content capture function;
    iv) a rights verification and assignment; and
    v) an identification (ID) authentication of a user;
  b) said content capture function provides capability to ingest video content comprising:
    i) an analog video from an analog video camera;
    ii) a digital video from a digital video camera;
    iii) a physical DVD purchased by the user; and iv) a video purchased from a server;
  c) wherein said user of the PVD registered with said server selects a title of a video from a menu of the server to be purchased, downloaded and stored in said nonvolatile storage of the PVD, whereby communications between the server and the PVD through a network interface port of the capture content function;
  d) whereupon authentication of the user ID, the rights verification and assignment performed on the video content stored in the nonvolatile storage with the video;
  e) after which the user selects said video content to be displayed on a TV screen, connected to the TV interface, from amongst a listing of previously stored video content within said nonvolatile storage; and
  f) subsequent viewing of each video stored in said PVD with the rights verification and assignment requires said ID authentication of the user.

2. The system of claim 1, wherein said ingested video content from said purchased DVD has rights verification and assignment performed by said PVD and said rights verification and assignment is stored along with the video content of the purchased DVD.

3. The system of claim 1, wherein said nonvolatile storage is a non-volatile storage medium comprising a disk drive or a flash memory.

4. The system of claim 1, wherein said rights verification and assignment provides the user the rights to new video content and to play the new video stored in the PVD.

5. The system of claim 1, wherein said ID authentication of the user utilizes a smart card with the user identity or a pin number entered on a remote controller.

6. The system of claim 1, wherein said network interface port is connected to an internet connection or equivalent communication network.

7. The system of claim 1, wherein the TV interface function comprises a graphical user interface operated by a remote control unit.

8. A method for acquiring a video title from a server, comprising:
  a) authenticating a user of a personal video depot (PVD);
  b) contacting a server with which said user is registered;
  c) selecting a desired video from a list of video titles;
  d) verifying the user and an account of the user;
  e) purchasing and downloading the desired video to the PVD;
  f) performing a rights verification and assignment on the desired video; and
  g) storing the desired video and the rights verification and assignment in a non-volatile storage of the PVD.

9. The method of claim 8, wherein authenticating the user is through the use of a mechanism comprising use of a smart card or a personal identification number.

10. The method of claim 8, wherein contacting the server is through a network connection between the server and the PVD.

11. The method of claim 8 wherein verifying the user and the account of the user allows the server to apply proper charges including charges for any rights verification and assignment performed on the purchased video that is ingested into the PVD by the user.

12. The method of claim 8, wherein the purchasing and downloading of the desired video is by a network coupling of the server to the PVD.

13. The method of claim 8, performing rights verification and assignment verifies that the user has the right to use the purchased video stored in the PVD.

14. A personal video depot for acquiring video files to be played on a display screen, comprising:
  a) a means for capturing (importing) video content into a personal video depot (PVD) and storing said video content onto a nonvolatile storage device of the PVD, wherein the means for importing video content into the PVD further comprises:
    i) a means for selecting and downloading a video from a server coupled to the PVD;
    ii) a means for ingesting into the PVD a DVD purchased by a user of the PVD;
    iii) a means for ingesting into the PVD a personal video taken with a personal video camera;
  b) a means for authenticating (verifying) an identity of the user of said PVD;
  c) a means for displaying a menu on a TV connected to the PVD, a listing of operations and stored content of the PVD and a listing of video titles for purchase located on said network coupled server, wherein a remote control device coupled to the PVD used to select from said menu and control operation of said PVD; and
  d) a means for performing a rights verification and assignment on said selected video and said purchased DVD and storing the rights verification and assignment along with the selected video and the DVD onto said storage device of the PVD.

15. The personal video depot of claim 14, wherein the means for verifying the identity of the user comprises the use of a smart card, personal identification number or similar devices and operations.

16. The personal video depot of claim 14, wherein the means for selecting from the menu of video titles is by selecting the desired video title displayed on the TV coupled to the PVD using a remote device coupled to the PVD.

17. The personal video depot of claim 14, wherein the means for downloading the video is through a network coupling the server to the PVD.

18. The personal video depot of claim 14, wherein the means for performing rights verification and authorization comprises:
  a) providing verification of the rights of the user to use and view the video stored in the PVD, and
  b) providing verification of the rights of the user to use and view a directly purchased DVD ingested into the PVD.

* * * * *